US009844096B2

(12) United States Patent
Son et al.

(10) Patent No.: US 9,844,096 B2
(45) Date of Patent: Dec. 12, 2017

(54) MOBILE TERMINAL AND CONTROLLING METHOD THEREOF

(71) Applicant: LG ELECTRONICS INC., Seoul (KR)

(72) Inventors: Jiyen Son, Seoul (KR); Younghoon Song, Seoul (KR); Choonjae Lee, Seoul (KR); Minjeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/059,236

(22) Filed: Mar. 2, 2016

(65) Prior Publication Data

US 2016/0183326 A1     Jun. 23, 2016

Related U.S. Application Data

(63) Continuation of application No. 14/010,339, filed on Aug. 26, 2013.
(Continued)

(30) Foreign Application Priority Data

Aug. 28, 2012 (KR) .......................... 10-2012-0094585

(51) Int. Cl.
*G08C 19/16* (2006.01)
*H04W 88/08* (2009.01)
(Continued)

(52) U.S. Cl.
CPC ............ *H04W 88/08* (2013.01); *G06F 3/016* (2013.01); *G06F 3/0482* (2013.01);
(Continued)

(58) Field of Classification Search
CPC ...... H04W 88/08; G06F 3/016; G06F 3/0482; G06F 3/04842; G06F 3/04883; G08C 2201/30; G08C 2201/50; G08C 2201/92
(Continued)

(56) References Cited

U.S. PATENT DOCUMENTS 8,954,736 B2 * 2/2015 Miller ..................... G06F 21/51
                                                                    713/166
9,020,968 B2 * 4/2015 Lim ........................ G08C 19/28
                                                                    707/769
(Continued)

FOREIGN PATENT DOCUMENTS

CN       101894023      11/2010
CN       102270038      12/2011
(Continued)

OTHER PUBLICATIONS

European Patent Office Application Serial No. 13179240.0 Search Report dated Dec. 12, 2013, 7 pages.
(Continued)

*Primary Examiner* — Zhen Y Wu
(74) *Attorney, Agent, or Firm* — Lee Hong Degerman Kang & Waimey

(57) ABSTRACT

A mobile terminal and controlling method thereof are disclosed. The present invention includes a touchscreen; a memory configured to store access point (AP) information; a $1^{st}$ wireless communication unit configured to perform a communication with an AP (access point); and a controller configured to control a user interface for remotely controlling an external device to be displayed on the touchscreen or to be in a displayable state when the AP connected to the $1^{st}$ wireless communication unit matches the stored AP information.

35 Claims, 14 Drawing Sheets

Related U.S. Application Data

(60) Provisional application No. 61/693,756, filed on Aug. 27, 2012.

(51) Int. Cl.
| | | |
|---|---|---|
| *G08C 17/02* | (2006.01) | |
| *H04M 1/725* | (2006.01) | |
| *G06F 3/01* | (2006.01) | |
| *G06F 3/0482* | (2013.01) | |
| *G06F 3/0484* | (2013.01) | |
| *G06F 3/0488* | (2013.01) | |
| *G08C 23/04* | (2006.01) | |
| *H04M 1/67* | (2006.01) | |

(52) U.S. Cl.
CPC ...... *G06F 3/04842* (2013.01); *G06F 3/04883* (2013.01); *G08C 17/02* (2013.01); *G08C 23/04* (2013.01); *H04M 1/72533* (2013.01); *G08C 2201/30* (2013.01); *G08C 2201/50* (2013.01); *G08C 2201/92* (2013.01); *G08C 2201/93* (2013.01); *H04M 1/67* (2013.01); *H04M 2250/06* (2013.01)

(58) Field of Classification Search
USPC ................................................ 340/12.54
See application file for complete search history.

(56) References Cited

U.S. PATENT DOCUMENTS

| | | | |
|---|---|---|---|
| 2002/0093424 A1 | 7/2002 | Parry | |
| 2003/0133578 A1* | 7/2003 | Durant | G06N 3/126 381/60 |
| 2004/0168002 A1* | 8/2004 | Accarie | H04N 21/43632 710/62 |
| 2006/0276221 A1* | 12/2006 | Lagnado | G06F 1/162 455/552.1 |
| 2007/0294212 A1* | 12/2007 | Ozaki | G06F 17/30265 |
| 2008/0055276 A1 | 3/2008 | Chang | |
| 2009/0102805 A1* | 4/2009 | Meijer | G06F 3/016 345/173 |
| 2009/0153368 A1* | 6/2009 | Hur | G06F 3/0414 341/20 |
| 2009/0167508 A1* | 7/2009 | Fadell | G06F 3/016 340/407.2 |
| 2009/0265670 A1* | 10/2009 | Kim | G06F 3/04883 715/863 |
| 2010/0138764 A1* | 6/2010 | Hatambeiki | G08C 17/02 715/765 |
| 2010/0157171 A1* | 6/2010 | Hayes | G08C 17/02 348/734 |
| 2010/0328223 A1* | 12/2010 | Mockarram-Dorri | G06F 3/041 345/173 |
| 2011/0025479 A1* | 2/2011 | Hwang | B06B 1/0207 340/407.1 |
| 2011/0047368 A1* | 2/2011 | Sundaramurthy | G06F 3/0481 713/100 |
| 2011/0157052 A1* | 6/2011 | Lee | G06F 1/1626 345/173 |
| 2011/0157478 A1* | 6/2011 | McRae | H04N 5/4403 348/734 |
| 2011/0230235 A1* | 9/2011 | Jan | H04M 1/72569 455/557 |
| 2011/0320959 A1* | 12/2011 | Maly | G06Q 10/10 715/752 |
| 2012/0054671 A1* | 3/2012 | Thompson | G06F 3/038 715/784 |
| 2012/0060123 A1* | 3/2012 | Smith | G06F 3/04883 715/833 |
| 2012/0154108 A1 | 6/2012 | Sugaya | |
| 2012/0196639 A1* | 8/2012 | Takeda | H04W 48/14 455/515 |
| 2012/0223959 A1* | 9/2012 | Lengeling | G06F 3/04883 345/619 |
| 2012/0278744 A1* | 11/2012 | Kozitsyn | G06F 3/0481 715/764 |
| 2013/0069888 A1* | 3/2013 | Cho | G06F 1/3265 345/173 |
| 2013/0106774 A1* | 5/2013 | Radivojevic | G06F 3/044 345/174 |
| 2014/0055251 A1 | 2/2014 | Son et al. | |

FOREIGN PATENT DOCUMENTS

| | | |
|---|---|---|
| CN | 102520940 | 6/2012 |
| CN | 102567240 | 7/2012 |
| EP | 2392993 | 12/2011 |

OTHER PUBLICATIONS

U.S. Appl. No. 14/010,339, Final Office Action dated Sep. 26, 2016, 24 pages.
European Patent Office Application Serial No. 13179240.0, Office Action dated Mar. 8, 2017, 6 pages.
Maniii, "How to dismiss a custom dialog based on touch points?", XP055351124, Nov. 7, 2010, 3 pages.
Goddchen, "Dialog with custom view, setCanceledOnTouchOutside doesn't work," Stack Overflow, XP055351126, May 30, 2011, 2 pages.

\* cited by examiner

FIG. 5
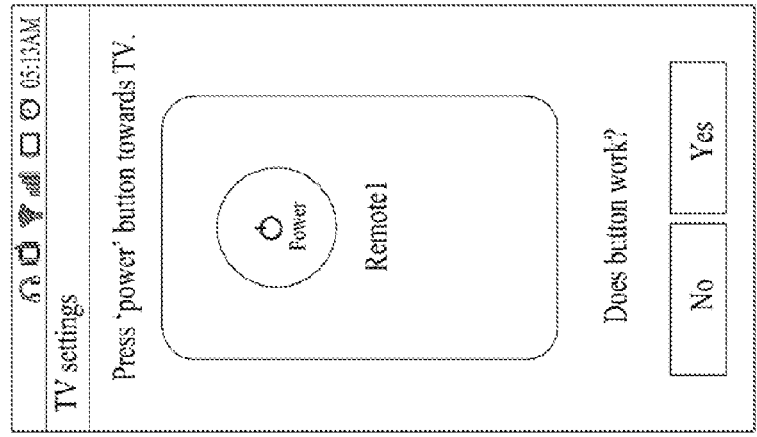
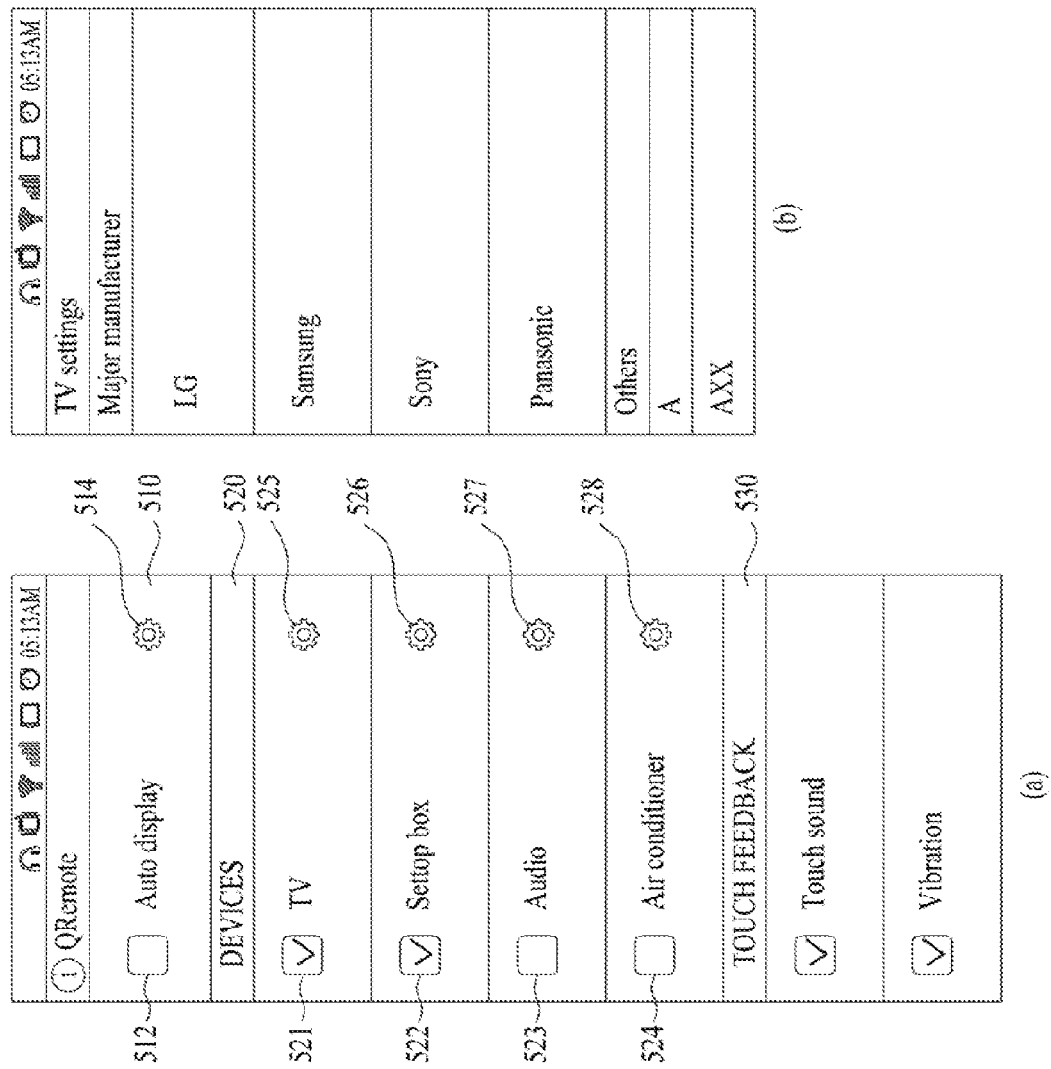

910

MOBILE TERMINAL AND CONTROLLING METHOD THEREOF

CROSS REFERENCE TO RELATED APPLICATIONS

This applicationThis application is a continuation of U.S. patent application Ser. No. 14/010,339, filed on Aug. 26, 2013, now abandoned, which claims the benefit of U.S. Provisional Application No. 61/693,756, filed on Aug. 27, 2012 and also claims the benefit of earlier filing date and right of priority to Korean Application No. 10-2012-0094585, filed on Aug. 28, 2012, the contents of which are all hereby incorporated by references herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for controlling an operation of an external device remotely.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As functions of a terminal tend to expand, many attempts to use the terminal for everyday life are increasing. One of the attempts is to utilize a mobile terminal as a TV remote controller. In order to utilize a mobile terminal as a TV remote controller, a user installs a remote controller application on the mobile terminal, thereby utilizing the mobile terminal as a remote controller of a TV, an air conditioner and the like. However, in case that a remote controller application is installed on a mobile terminal, it is inconvenient for a user to activate the remote controller application each time intending to use the mobile terminal as a remote controller.

SUMMARY OF THE INVENTION

Accordingly, the present invention is directed to a mobile terminal and controlling method thereof that substantially obviate one or more problems due to limitations and disadvantages of the related art.

One object of the present invention is to provide a mobile terminal and controlling method thereof, by which user's convenience in using the mobile terminal is enhanced.

In particular, if a mobile terminal according to the present invention enters a preset network, the mobile terminal can automatically function as a remote controller for controlling operations of an external terminal.

Another object of the present invention is to provide a mobile terminal and controlling method thereof, by which an operation of an external terminal can be easily controlled while a screen of the mobile terminal is locked or another job is being performed via the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen; a memory configured to store access point (AP) information; a $1^{st}$ wireless communication unit configured to perform a communication with an AP (access point); and a controller configured to control a user interface for remotely controlling an external device to be displayed on the touchscreen or to be in a displayable state when the AP connected to the $1^{st}$ wireless communication unit matches the stored AP information.

In another aspect of the present invention, a method of controlling a mobile terminal includes the steps of saving access point (AP) information, requesting an access to an AP (access point), determining whether the AP matches the AP information, and if the AP matches the AP information, displaying a user interface for remotely controlling an operation of an external device or enabling the user interface to be in a displayable state.

Effects and/or advantages obtainable from the present invention are non-limited the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram for one example of a screen provided to specify a manufacturer of an external device;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
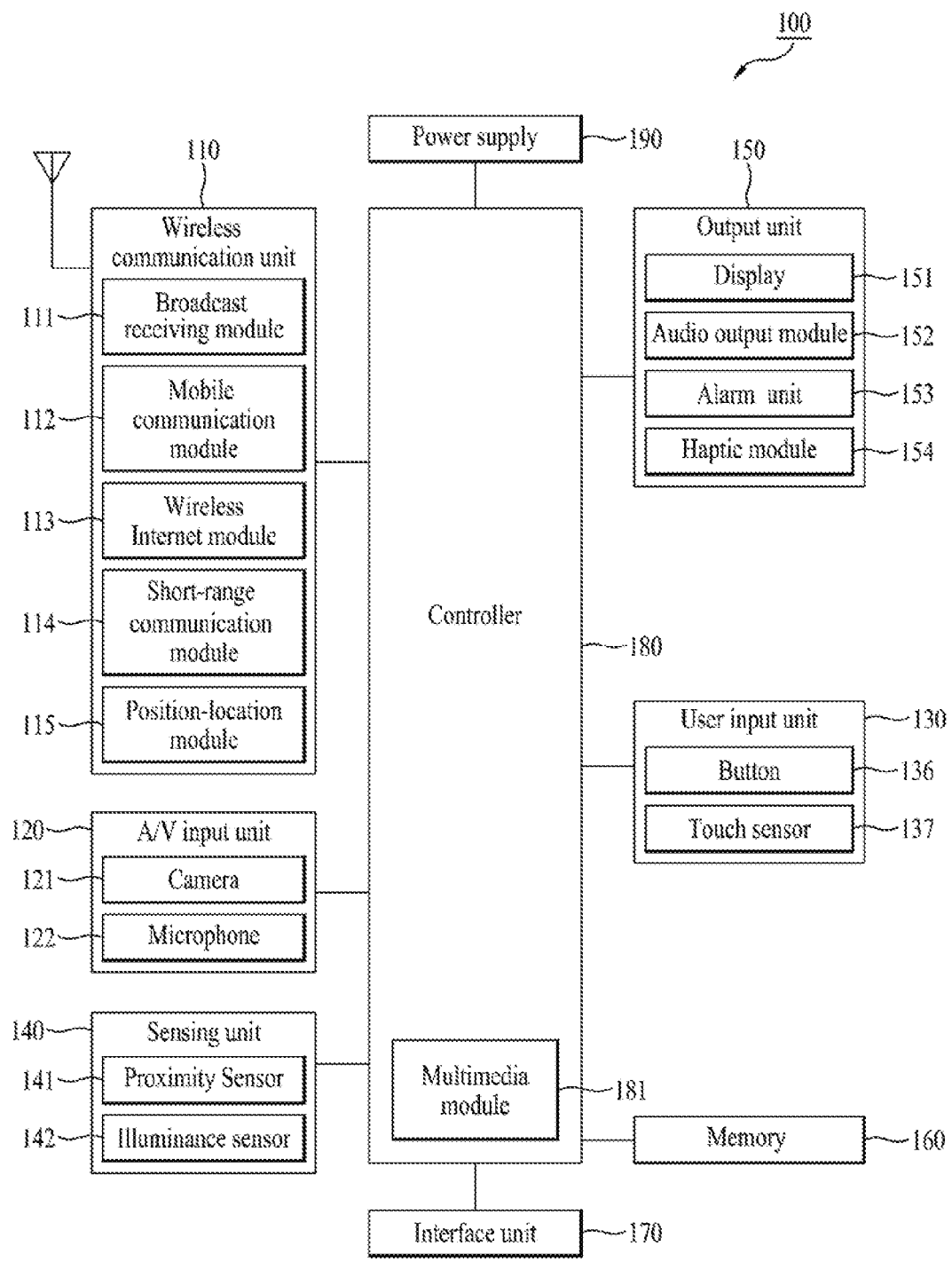
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
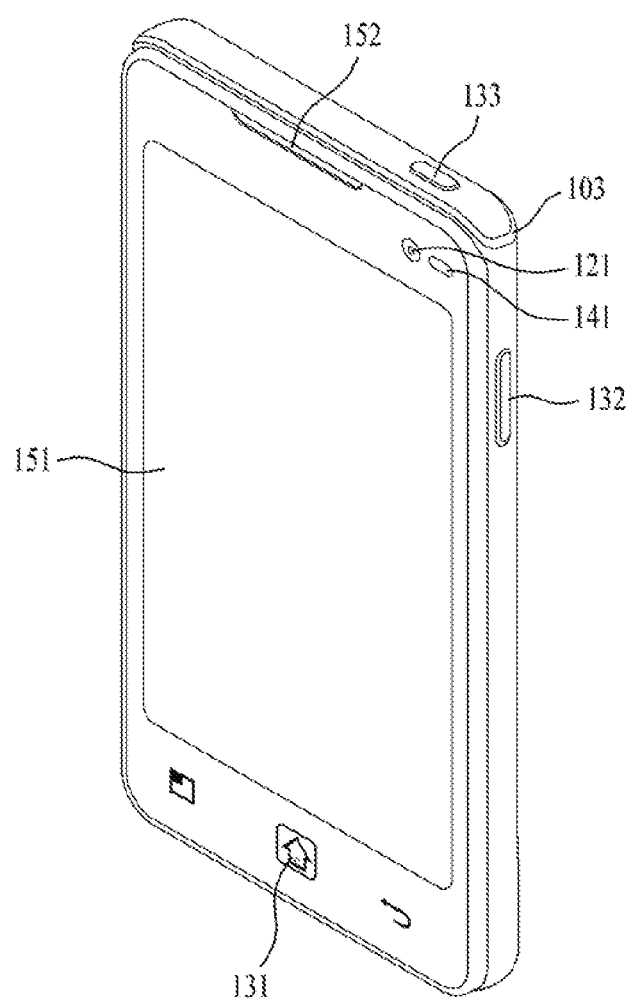
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
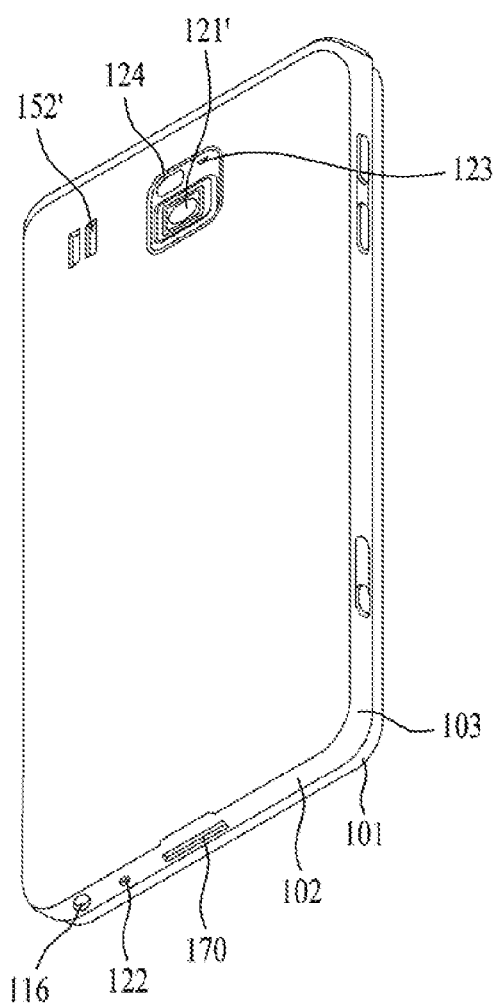
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal mentioned in the following description includes at least one of the components shown in FIG. 1. In particular, assume that a mobile terminal 100 according to the present invention includes the wireless communication unit 110, the display unit 151, the memory 160 and the controller 180 among the components shown in FIG. 1. The mobile terminal 100 according to the present invention may include the wireless internet module 113 and the short range communication module 114 configured to perform a short range communication in the wireless communication unit 110 shown in FIG. 1. In particular, the wireless internet module 113 may be configured to perform an access to an access point (AP) and the short range communication module 114 may be configured to deliver a control signal for controlling an operation of an external device. The wireless internet module 113 may include a WLAN communication module configured to perform Wi-Fi communication and the short range communication module 114 may include an infrared communication module configured to perform an infrared communication (IrDA), by which the present invention may be non-limited.

In the mobile terminal 100 according to the present invention, if the display unit 151 includes a touchscreen, it may facilitate implementation of the present invention. Hence, in the following description, assume that the display unit 151 includes the touchscreen.

Prior to describing operations of the mobile terminal 100 according to the present invention, a remote controller program for remotely controlling an external terminal is described as follows.

First of all, a remote controller program is configured to remotely control operations of an external device. And, the controller 180 is able to generate a control signal for remotely controlling the external device via the remote controller program. Using the remote controller program, the mobile terminal 100 can be used as a traditional remote controller. Once the remote controller program is active, the controller 180 can control a control board for controlling operations of the external device externally to be displayed. This is described in detail with reference to FIG. 4 as follows.

FIGS. 4A to 4D are diagrams for one example to describe a remote controller program according to the present invention.

Referring to FIGS. 4A to 4D, once a remote controller program is activated, the controller 180 can control a control board 400, which is configured to control operations of an external device, to be displayed. In this case, the control board 400 may mean a user interface (hereinafter abbreviated UI) in which buttons for remotely controlling the operations of the external device are put together. Based on a user input to the control board 400, the controller 180 generates a control signal for remotely controlling an operation of the external device. The controller 180 then transmits the generated control signal to the external device, thereby controlling the external device to operate based on the corresponding control signal.

In FIGS. 4A to 4D, the control board 400 may include tab button regions 412, 414, 416 and 418 for selecting external devices to control remotely and a control button region 420 for controlling operations of the external devices. If a user applies a touch input to one of the tab buttons 412, 414, 416 and 418, the user can specify the external device to remotely control. Once the external device to be remotely controlled is specified, the controller 180 can control the specified external device to be identified through an indicator. In FIGS. 4A to 4D, a star-shape indicator 430 is displayed on an activation tab for example, thereby enabling the specified external device to become identifiable. For instance, in FIGS. 4A to 4D, the tab buttons 412, 414, 416 and 418 of a TV, a settop box, an audio system and an air conditioner are in active states, respectively. Hence, through the control boards 400 shown in FIGS. 4A to 4D, operations of the TV, settop box, audio system and air conditioner can be controlled individually and remotely.

The control board 400 shown in FIGS. 4A to 4D shall be sequentially described as follows.

Figure 4A:
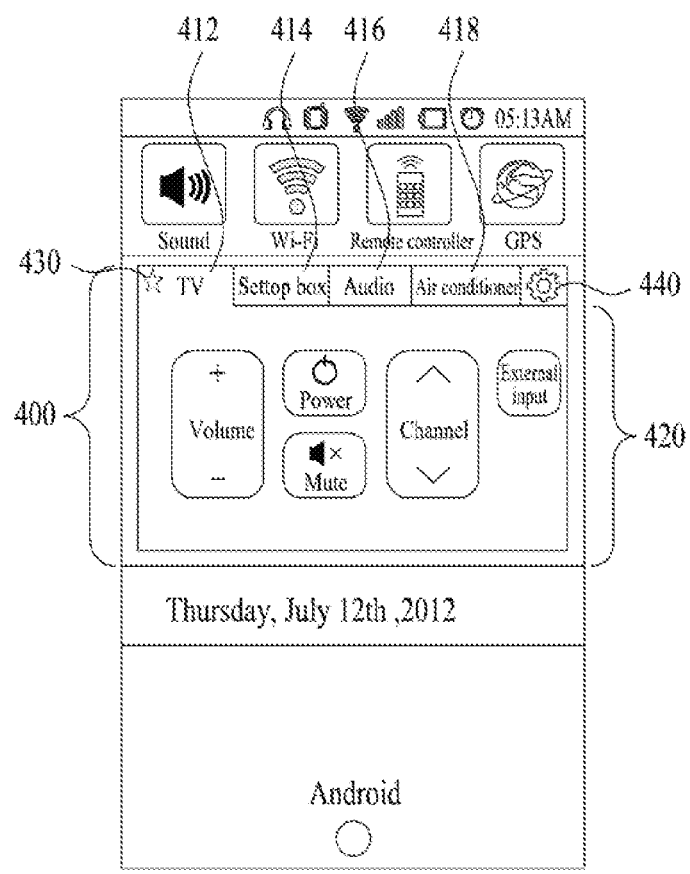
FIGS. 4A to 4D are diagrams for one example to describe a remote controller program according to the present invention.

First of all, referring to FIG. 4A, a power button, a volume adjust button, a channel adjust button, a mute button and an external input button are displayed on the TV control board 400 for controlling the TV for example. The power button shown in FIG. 4A may be understood as provided to remotely control power ON/OFF of the TV, the volume adjust button may be understood as provided to remotely control a volume of the TV, and the channel adjust button may be understood as provided to remotely control a channel of the TV. Moreover, the mute button may be understood as provided to set the TV to enter a mute state and the external input button may be understood as provided to adjust whether to activate a TV external input terminal channel.

Figure 4B:
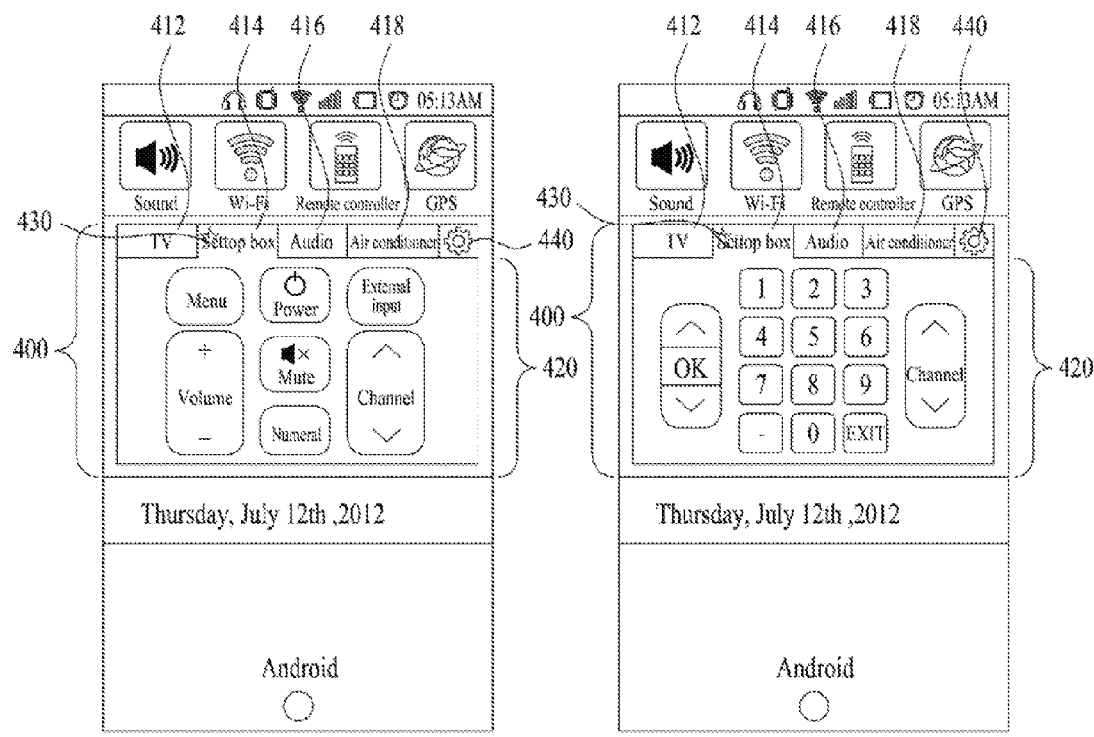

Referring to FIG. 4B, a power button, a volume adjust button, a channel adjust button, a mute button, an external input button and a numeral button are displayed on the settop box control board 400 for controlling the settop box for example. The power button shown in FIG. 4B may be understood as provided to remotely control power ON/OFF of the settop box, the volume adjust button may be understood as provided to remotely control a volume of the settop box, and the channel adjust button may be understood as provided to remotely control a channel of the settop box. Moreover, the mute button may be understood as provided to set the settop box to enter a mute state and the external input button may be understood as provided to adjust whether to activate a settop box external input terminal channel. The numeral button shown in FIG. 4B may be understood as provided to page a numeral button. If the numeral button is paged, a user can adjust a channel of the settop box by manipulating the numeral button.

Figure 4C:
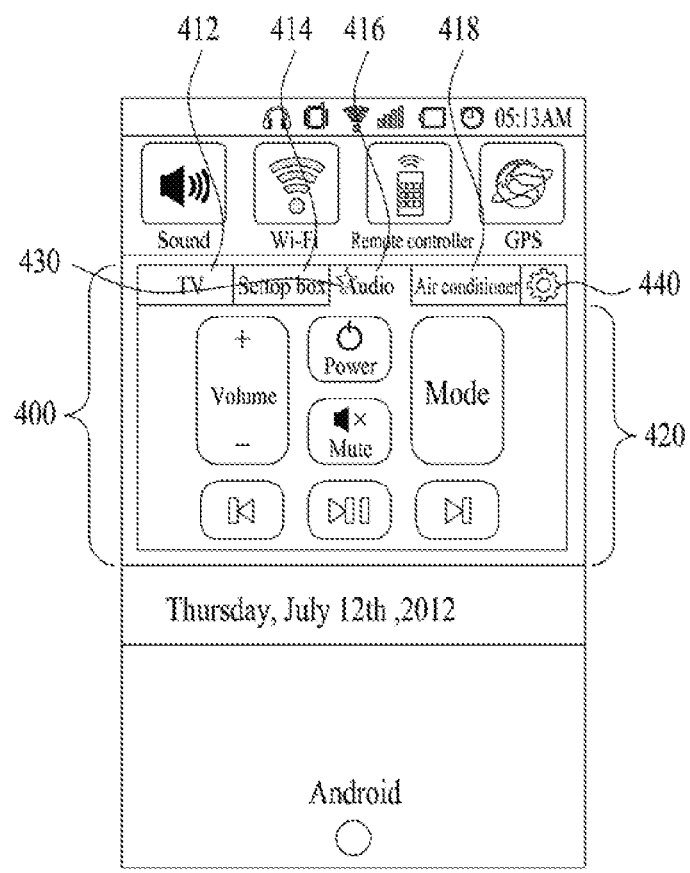

Referring to FIG. 4C, a power button, a volume adjust button, a mute button, a mode adjust button, a play/pause button, a skip button and a rewinder button are displayed on the audio system control board 400 for controlling the audio system for example. The power button shown in FIG. 4C may be understood as provided to remotely control power ON/OFF of the audio system and the volume adjust button may be understood as provided to remotely control a volume of the audio system. Moreover, the mute button may be understood as provided to set the audio system to enter a mute state and the mode adjust button may be understood as provided to adjust a play mode of the audio system. For instance, the play mode of the audio system may be set to at least one of a tape play mode, a CD play mode, a DVD play mode, a radio mode, an external device connect mode, and a Bluetooth play mode. The play/pause button, the skip button and the rewinder button may be understood as provided to adjust a play/pause, a skip and a rewinder of a multimedia content outputted via the audio system, respectively.

Figure 4D:
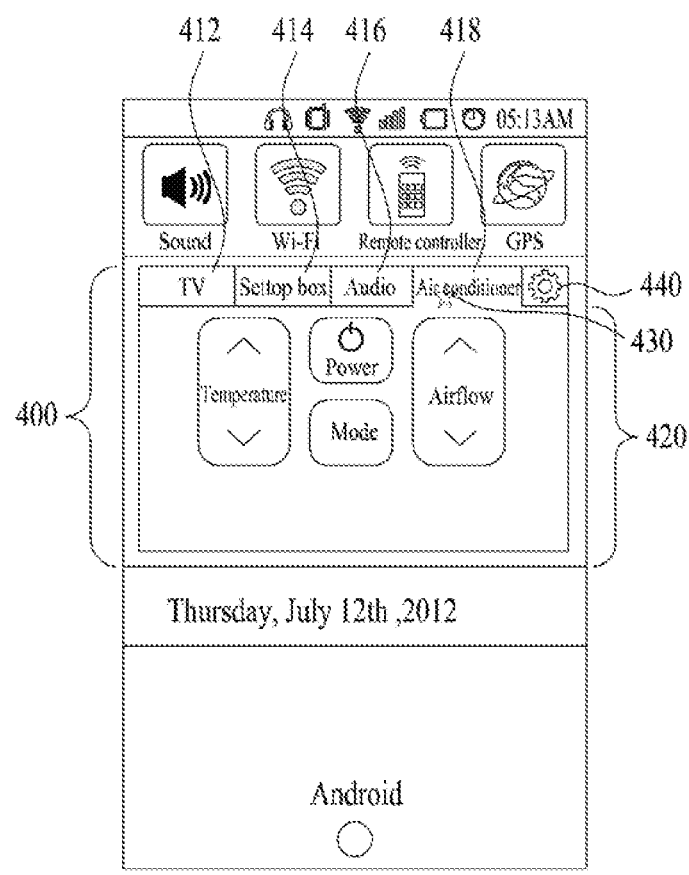

Referring to FIG. 4D, a power button, a temperature adjust button, a mode adjust button and an airflow adjust button are displayed on the air conditioner control board 400 for controlling the air conditioner for example. The power button shown in FIG. 4D may be understood as provided to remotely control power ON/OFF of the air conditioner and the temperature adjust button may be understood as provided to remotely adjust a desired temperature in case of activating the air conditioner. Moreover, the airflow adjust button may be understood as provided to adjust an air conditioner airflow level and the mode adjust button may be understood as provided to adjust an operating mode of the air conditioner. For instance, the operating mode of the air conditioner may be set to one of a normal mode and a power-saving mode.

The types of the external devices shown in FIGS. 4A to 4D and the types of the control buttons displayed on the control boards 400 are provided for clarity and convenience of the description only, by which the present invention may be non-limited. It is a matter of course that the present invention is applicable to remotely controlling external devices of which types are different from those of the former external devices shown in FIGS. 4A to 4D. And, it is a matter of course that buttons different from those shown in FIGS. 4A to 4D can configure the control boards 400. For instance, the mobile terminal 100 according to the present invention may be utilized as a remote controller configured to remotely adjust operations of at least one of an illumination device, a washer, a microwave oven and the like. And, a keypad for inputting text rings can be displayed on the control board 400. Moreover, it may be unnecessary for the control board 400 to include the tab button region and the control button region, as shown in FIGS. 4A to 4D. For instance, if there is only one external device of a type selectable as a control target, the tab button region can be omitted from being displayed. The number and/or types of control buttons displayable on the control board 400 may be changeable depending on a state of an external device. For instance, if the external device in OFF state, the controller 180 controls the power button to be displayed on the control board 400. In doing so, if the external device enters ON state, the controller 180 then controls additional control button(s) (e.g., a channel adjust button, a volume adjust button, etc.) to be displayed.

A remote controller program explained in the description of the present invention may support widgets. Hence, the control board 400 mentioned in the foregoing description may be displayed as a full screen on the touchscreen 151. Alternatively, the control board 400 may be displayed as a widget in a manner of overlaying a home screen (e.g., a basic screen appearing on pressing a home button of a mobile terminal) or the like.

After the external device to be remotely controller has been specified, if a user input is applied via the control board 400, the controller 180 generates a control signal for controlling an operation of the external device and is then able to remotely control the operation of the external device by transmitting the generated control signal to the external device. In particular, the controller 180 can transmit the control signal to the external device via the wireless internet module 113 or the short range communication module 114. In case that the control signal is transmitted via the wireless internet module 113, a network address of the external device is set as a destination to provide the control signal to the external device. In particular, the control signal may be transmitted using TCP/IP (transmission control protocol/internet protocol) communication. In case that the external device is remotely controlled using the TCP/IP communication, the mobile terminal 100 may receive feedback information on the control signal from the external device. In this case, the feedback information may mean operating state information of the external device and an operating state changed by the control signal may be handled as the feedback information. For instance, if the control signal is the signal for turning on/off the TV, the feedback information may be related to the power ON/OFF state of the TV. If the control signal is the signal for changing a channel of the TV, the feedback information may include the information on the changed channel of the TV. In order to transmit the control signal via the short range communication module 114 using infrared (IrDA) communication, the short range communication module 14 of the mobile terminal 100 should be situated to face the external device (particularly, an infrared port of the external device) while the mobile terminal 100 maintains a sufficiently close distance from the external device. If bidirectional IrDA communication is used, the mobile terminal 100 can receive the feedback information on the control signal from the external device.

The controller 180 of the present invention can determine a state of an external device based on at least one of a feedback information and a manipulation history of the external device.

For instance, if the controller 180 can receive the feedback information from the external device, the controller 180 may be able to determine whether the external device is in ON/OFF based on the received feedback information. Even if the controller 180 does not receive the feedback information from the external device, the controller 180 may be able to determine an operating state of the external device based on a history of user's manipulation on the control board. For instance, if a user initially applies a power ON/OFF input of the control board once, the controller 180 recognizes the initial input as applied to turn on the external device. If the user applies the power ON/OFF input twice, the controller 180 determines it as inputted to turn off the external device. And, the controller 180 can determine that the external device in ON state until receiving the $2^{nd}$ power ON/OFF input since the reception of the $1^{st}$ power ON/OFF input.

In case of attempting to transmit a control signal using the IrDA communication, it may be necessary to specify an external device manufacturer. Since the compatibility of IrDA varies depending on a difference of IR code, a control signal compatible with an external device of a $1^{st}$ manufacturer is not always compatible with an external device of a $2^{nd}$ manufacturer. Hence, before a control signal is transmitted by IrDA, a process for specifying a manufacturer of an external device needs to be performed in advance in order to check the compatibility of a previous IR code. The process for specifying the manufacturer of the external device is described in detail with reference to FIG. 5 as follows.

FIG. 5 is a diagram for one example of a screen provided to specify a manufacturer of an external device.

Referring to FIG. 5, if a user input is applied to the setting button 440 of the control board shown in FIG. 4, the controller 180 can control a setting screen of a remote controller program to be displayed [FIG. 5 (a)]. On the setting screen shown in FIG. 5 (a), a device setting tab 520 and a feedback setting tab 530 are displayed together with an auto display setting region 510 for example. An operation of the mobile terminal 100 related to the display setting region 510 shall be described later.

The device setting tab 520 shown in FIG. 5 (a) enumerates types of external terminals remotely controllable via the mobile terminal 100 and is provided to select at least one of the enumerated external terminals as a target of a remote control. For instance, if a user applies a touch input to each of 'TV', 'settop box', 'audio' and 'air conditioner' regions shown in FIG. 5 (a), the controller 180 can control outputs of check boxes 521 to 524 each of which whether a corresponding external device is selected. Thereafter, based on the selected external device, the controller 180 can adjust an active tab configuration of the control board. For instance, referring to FIG. 5 (a), if the TV and the settop box are selected [cf. '521', '524'], the controller 180 can configure the control board to remotely control the TV and the settop box only. In this case, unlike the former example shown in FIG. 4 showing that the activation tabs of the TV, settop box, audio system and air conditioner are displayed, the controller 180 can control the activation tabs of the TV and the settop box to be displayed only.

Moreover, a user can select manufacturers of the external devices enumerated on the device setting tab 520. For instance, if a user input is applied to the TV setting button 525 [FIG. 5 (a)], the controller 180 can control a selection screen, on which a list of TV manufacturers is enumerated, to be displayed [FIG. 5 (b)]. If the user selects one of the manufacturers from the list, the user can select the corresponding TV manufacturer.

Once the user selects the TV manufacturer, the controller 180 can read out an IR code of the selected TV manufacturer from the memory 160. Thereafter, the controller 180 generates a test control signal using the read-out IR code and is then able to text a presence or non-presence of compatibility between the generated control signal and the external device. In particular, the controller 180 displays a text page of the example shown in FIG. 5 (c), generates a text control signal with an IR code that matches the TV manufacturer, and is then able to transmit the generated text control signal to the external device. The user is then able to complete the setting of the IR code by checking whether the text control signal is compatible with the external terminal.

Yet, although an external device is released by the same manufacturer, it is not necessary to use the same IR code. If IR codes are different despite the same manufacturer, a plurality of test control signals may be generated by changing the IR codes.

Besides, manufacturers can be selected for various external devices including a settop box, an audio system, an air conditioner and the like as well as a TV.

The 'auto display' region shown in FIG. 5 (a) is provided to adjust whether to activate an auto display function. The auto display function is to adjust an auto running of a remote controller program when the mobile terminal 100 enters a preset network. While the auto display function is active, if the mobile terminal 100 enters the preset network, the controller 180 can automatically activate the remote controller program. For instance, when the preset network is a home network, if the mobile terminal 100 enters the preset home network, the controller 180 automatically activates the remote controller program, thereby enabling a user to remotely control an operation of an external device through the mobile terminal 100. The settings of the home network can be performed in a manner of registering AP information in advance, like the example which will be described with reference to FIG. 6 later.

The activation of the auto display function can be triggered after a manufacturer of an external device becoming a target of a remote control has been selected. Before the selection of the external device manufacturer, even if the auto display function is activated, it is unable to secure compatibility of a control signal using IrDA. A user can manually adjust whether to activate the auto display function. If the manufacturer of the external device is selected, the controller 180 can control the auto display function to be automatically activated.

The feedback setting tab 530 shown in FIG. 5 (a) is provided to adjust a feedback output in response to a user input applied to a control board. While a touch sound item shown in FIG. 5 (a) is set active, if a touch input is applied to a control board, the controller 180 can control sound data to be outputted in response to the touch input to the control board. While a vibration item shown in FIG. 5 (a) is set active, if a touch input is applied to a control board, the controller 180 can control vibration to be outputted in response to the touch input to the control board.

Although the sound and vibration are taken as examples of feedback types, they are just provided for clarity and convenience of the description. And, the present invention may be non-limited by the sound and vibration. Alternatively, instead of the sound and vibration types, a feedback can be outputted in type of LED flickering, color change of a touched point or the like. Moreover, it is a matter of course that a feedback can be outputted in a manner of combining at least two of the above-enumerated feedback types.

In the following description, an operation of the mobile terminal 100 according to the present invention is explained based on the above-mentioned remote controller program.

Figure 6:
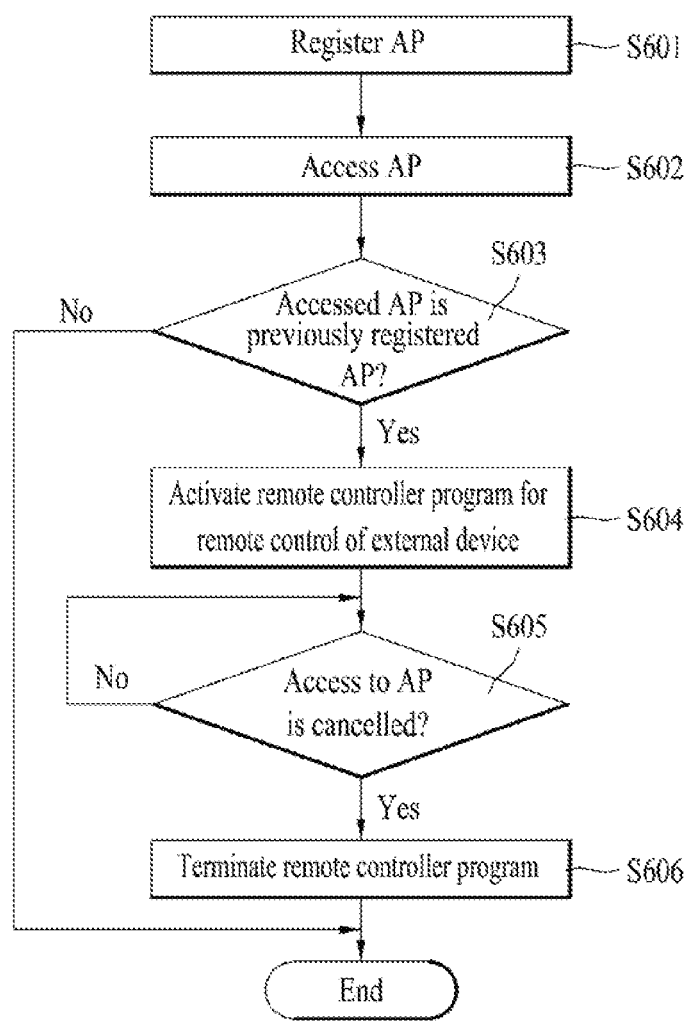
FIG. 6 is a flowchart for controlling a mobile terminal according to the present invention.

FIG. 6 is a flowchart for controlling a mobile terminal according to the present invention. For clarity of the following description, assume that a state of an auto display function of a remote controller program is set to an active state.

Referring to FIG. 6, the controller 180 can register an AP (access point) based on a user input [S601]. In particular, the controller 180 controls AP information to be saved in the memory 160 based on the user input, thereby completing the registration of the AP. In this case, the AP information may include at least one of a service set identifier (SSID) of the AP and a network address of the AP, by which the present invention may be non-limited. How the controller 180 registers the AP based on the user input is described with reference to FIG. 7 as follows.

Figure 7:
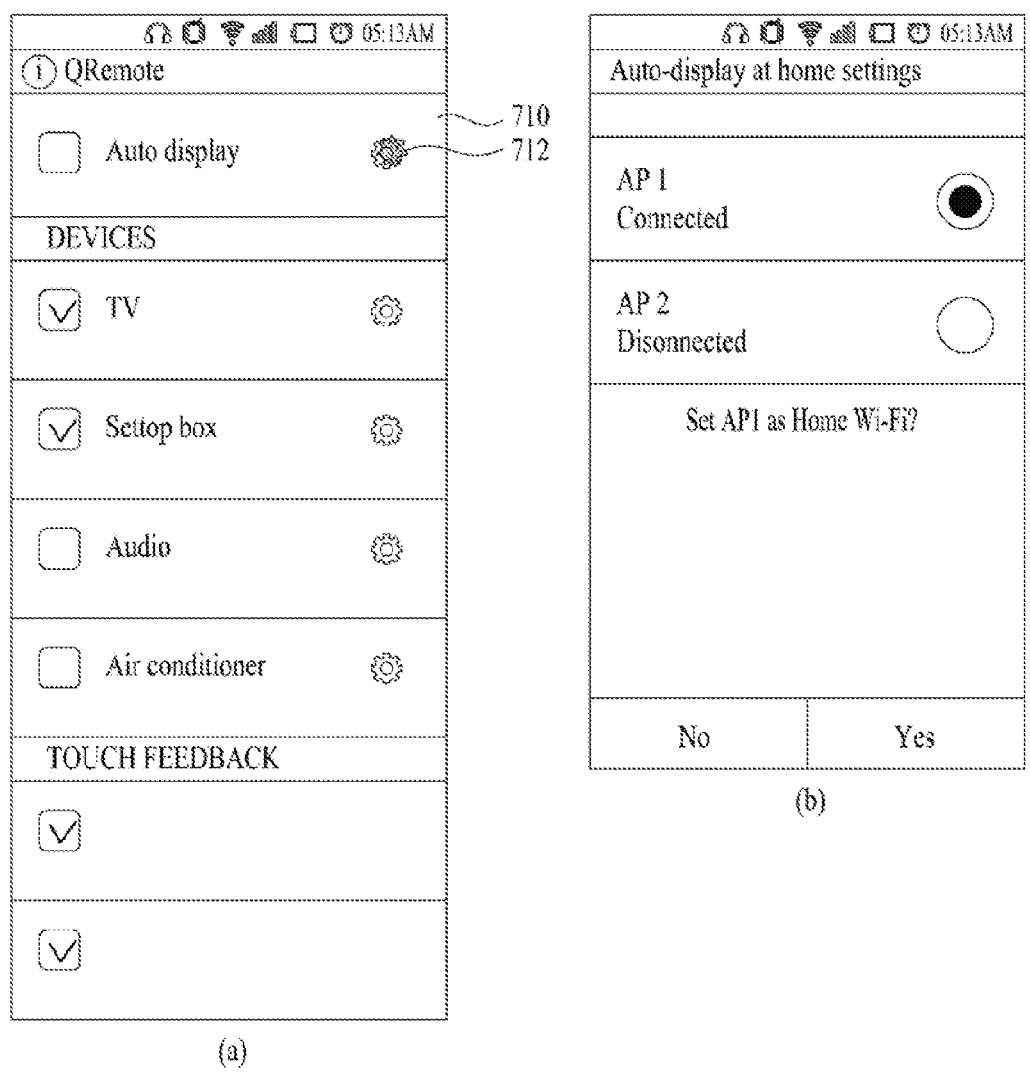
FIG. 7 is a diagram for one example to describe an AP registering process.

FIG. 7 is a diagram for one example to describe an AP registering process.

Referring to FIG. 7, in an auto display setting region 710, if a touch input is applied to a setting button 712 for adjusting detailed settings of an auto display function [FIG. 7 (a)], the controller 180 can control an AP list to be displayed [FIG. 7 (b)]. In the AP list, an AP currently transmitting a beacon signal to the mobile terminal and AP(s) having transmitted a beacon signal to the mobile terminal can be included.

FIG. 7 (b) shows one example that an AP having an SSID set to AP1 and an AP having an SSID set to AP2 are included in the AP list. The controller 180 saves AP information of the AP selected by a user in the memory 160, thereby completing AP registration. Since the AP1 is selected in FIG. 7 (b), the AP registration may be completed by saving the AP information of the AP1 in the memory 160. In this case, the AP information may include at least one of an SSI of the AP and a network address of the AP. In particular, the network address of the AP may include an IP address of the AP and/or a MAC address of the AP.

One example for registering an AP is described with reference to FIG. 7, by which the present invention may be non-limited. And, it is apparent that the AP registering process can be performed by various methods devisable by those skilled in the art as well as by the process shown in FIG. 7.

Referring now to FIG. 6, if the wireless internet module 113 accesses a random AP [S602], the controller 180 can determine whether the AP (hereinafter named an accessed AP) accessed by the wireless internet module 113 is a previously registered AP [S603]. In particular, the controller 180 determines whether an SSID and/or network address of the accessed AP is identical to the previously registered AP information, thereby determining whether the accessed AP matches the previously registered AP information.

If the accessed AP is the previously registered AP, the controller 180 can control a control board for remotely controlling an external device to be displayed or may control the control board to enter an displayable state [S604]. In this case, if the control board is displayed, it may mean that the control board is displayed as a full screen by activating a remote controller program or that the control board is displayed as a widget of the remote controller program. Moreover, if the control board enters the displayable state, it may mean that the control board is in a displayable state by receiving a prescribed user input.

Thus, the controller 180 can output the control board as the full screen or the widget. The control board of the widget type can be outputted to a home screen, a status board, a locked screen and the like.

In case that a prescribed touch input is applied to a status bar for displaying an operating state of the mobile terminal 100, the status board may be provided to adjust ON/OFF of various modules of the mobile terminal 100 and to display various indication informations. The controller 180 controls the control board of the widget type to be displayed on the status board, thereby increasing user's accessibility to the control board. A process for outputting the control board to the status board is described with reference to FIG. 8 as follows.

Figure 8:
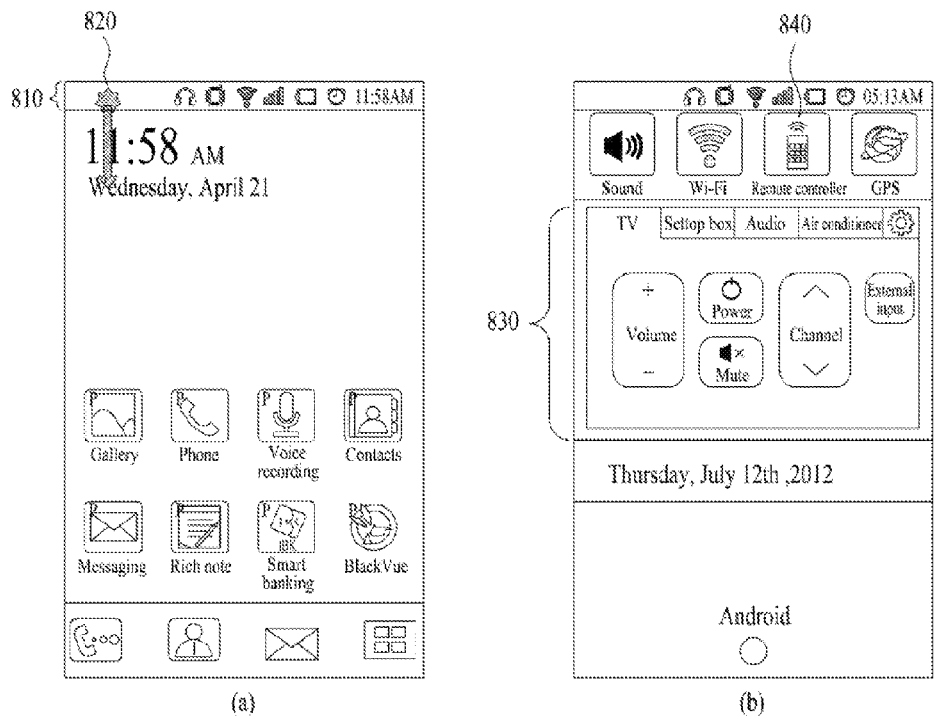
FIG. 8 is a diagram for one example to describe a process for displaying a control board on a status bar.

FIG. 8 is a diagram for one example to describe a process for displaying a control board on a status bar.

Referring to FIG. 8 (a), the controller 180 can control a status bar 810, which is provided to display an operating state of the mobile terminal 100, to be displayed on one side (e.g., a top end of the touchscreen 151 shown in FIG. 8 (a)) of the touchscreen 151. On the status bar 810, such an operating state information of the mobile terminal 100 as an absent call indication, a new text message reception indication, a vibration/sound mode setting indication, a current hour, a remaining battery level, a strength of signal received from a base station and the like can be displayed.

While the mobile terminal 100 accesses a previously registered AP, if a prescribed touch input 820 (e.g., an action of dragging the status bar in bottom direction) is applied to the status bar 810 [FIG. 8 (a)], the controller 180 displays a status board [FIG. 8 (b)] and then controls a control board 830, which is provided to adjust an operation of an external device, to be displayed on the status board.

If the status bar is exposed, the status board can be paged at any time. Hence, user's accessibility to the control board 830 can be enhanced. For instance, although such an operation as a web browser display, a music play, a video play, a camera photographing and the like is being performed, if a user applies a prescribed touch input to the status bar 810, it is able to remotely control an operation of an external device by paging the status board and the above-mentioned control board 830.

The controller 180 may control a control board to be displayed on a locked screen. Prior to describing a process for displaying a control board on a locked screen, the locked screen is described as follows.

First of all, if a prescribed condition is met, the controller 180 may control the mobile terminal 100 to enter a power saving mode. In this case, the power saving mode is to deactivate a touchscreen having high power consumption in order to raise battery power efficiency. For instance, if a touch input is not applied to the touchscreen 151 for a prescribed duration or a user applies a user input to an external button, the controller 180 may control the mobile terminal 100 to enter the power saving mode. While a mode of the mobile terminal 100 is set to the power saving mode, if a prescribed user input is applied, the controller 180 may control a locked screen to be displayed on the touchscreen 151. The locked screen ignores touch inputs other than a preset meaningful touch input, thereby preventing wrong inputs applied by a user.

If the power saving mode of the mobile terminal 100 having accessed the previously registered AP is cancelled, the controller 180 of the present invention can control a control board to be displayed on a locked screen. A process for displaying a control board on a locked screen is described in detail with reference to FIG. 9 as follows.

Figure 9A:
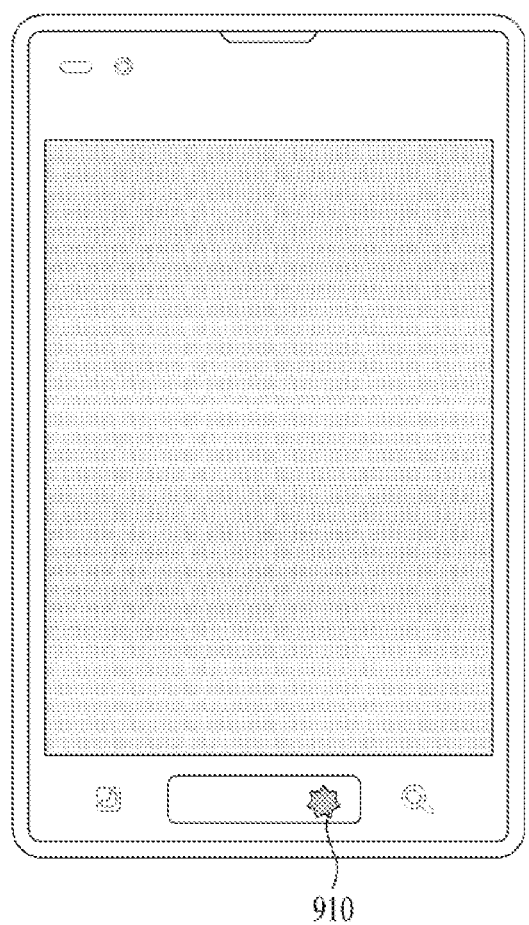
FIGS. 9A to 9C are diagrams for one example to describe a process for displaying a locked screen including a control board.
Figure 9B:
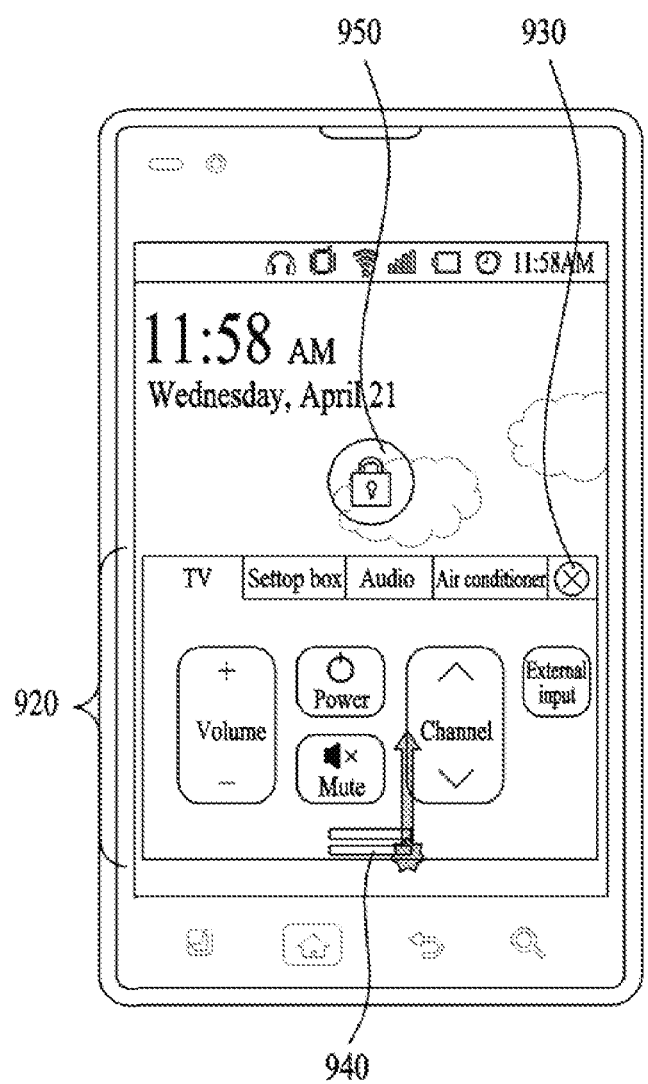
Figure 9C:
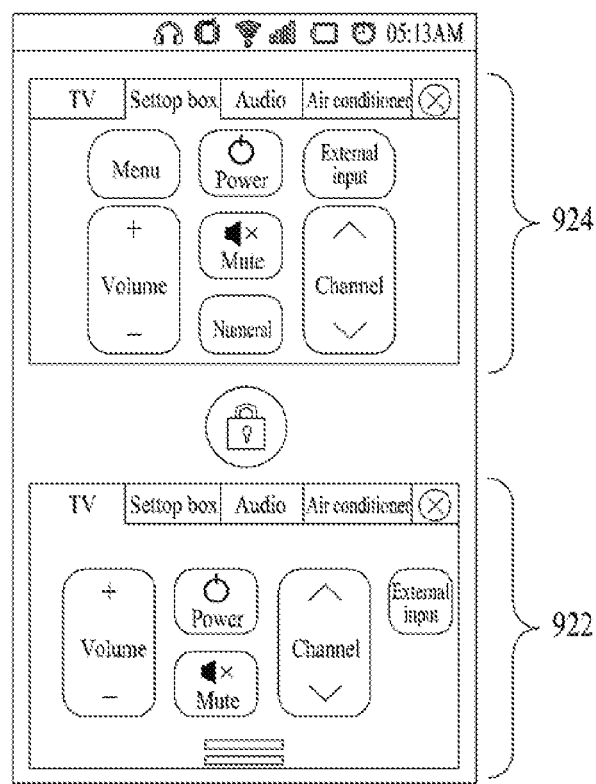

FIGS. 9A to 9C are diagrams for one example to describe a process for displaying a locked screen including a control board.

Referring to FIGS. 9A to 9C, as the touchscreen 151 is turned off in the mobile terminal 100 in a power saving state, any information is not displayed [FIG. 9A]. Thereafter, if a prescribed user input 910 is applied to the mobile terminal 100 (e.g., a user input is applied to an external key in FIG. 9A), the controller 180 turns on the touchscreen 151 and is then able to control a locked screen to be outputted [FIG. 9B]. In doing so, if the mobile terminal 100 is currently connected to a previously registered AP, the controller 180 can control a control board 920 to be displayed on the locked screen [FIG. 9B].

The controller 180 handles a user touch input to the control board 920 as a meaningful input, thereby enabling a user to remotely control an operation of an external device without unlocking the touchscreen 151. And, the user may select a type of an external device to control through a tab button provided to the control board 920.

Unlike the example shown in FIG. 9B, if a plurality of external devices are set as remote control targets (cf. the device setting tab 520 shown in FIG. 5 (a)), the controller 180 may control a plurality of control boards to be displayed to control a plurality of remote devices selected as the remote control targets, respectively.

For instance, if there are two remote devices (e.g., TV and settop box) selected as the remote control targets, referring to FIG. 9C, the controller 180 can control two control boards 922 and 924 to be displayed. Thus, if there are N remote devices selected as the remote control targets, the controller 180 may control N control boards to be simultaneously displayed.

If a touch is inputted to a close button 930 of the control board 920, the controller 180 may control the control board to stop being displayed. In particular, a user can control the control board to stop being displayed at any time.

While the locked screen is displayed, if a prescribed touch input is applied to the control board 920, the controller 180 may control the locked screen of the touchscreen to be cancelled (i.e., unlocked). For instance, referring to FIG. 9B and FIG. 9C, if a touch input for dragging a handler 940 displayed on one end of the control board 920 in a prescribed direction is received, the controller 180 may control the locked screen of the touchscreen 151 to be cancelled.

Of course, without using the control board 920, it is able to cancel the locked screen of the touchscreen 151 by a conventional method (e.g., a prescribed touch input applied onto a lock icon 950).

Once the locked screen of the touchscreen 151 is cancelled, the controller 180 may control a control board to be re-displayed as a widget on the home screen or the status board or may control the control board to be outputted as a full screen.

According to another embodiment of the present invention, the controller 180 can determine whether to keep running a remote controller program depending on a method of cancelling a locked screen of the touchscreen 151. In particular, the controller discriminates a case of cancelling a locked screen based on a touch input applied to the control board 920 from a case of cancelling a locked screen based on a touch input applied to an outside of the control board 920 and is then able to determine whether to keep running the remote controller program.

For instance, as a touch input is applied to the handler 940 of the control board 920, if the locked screen is cancelled, the controller 180 determines that the control board 920 is intended to keep being used after the cancellation of the locked screen of the touchscreen 151 and may control the control board 920 to keep being displayed. On the other hand, if the locked screen is cancelled based on a touch input to the lock icon 950, the controller 180 determines that the control board 920 is intended not to keep being used and may control the control board 920 to stop being displayed after the cancellation of the locked screen of the touchscreen 151.

According to the embodiment shown in FIG. 9, if a prescribed user input is applied to the touchscreen 151 in a power saving state, the controller 180 turns on the touchscreen 151 and a locked screen having the control board 920 displayed thereon is outputted. According to another example of the present invention, while a locked screen is outputted through the touchscreen 151, if a prescribed user input (e.g., a push to a home button) is applied, the controller 180 may control the control board 920 to be displayed on the locked screen.

While the mobile terminal 100 is connected to a previously registered AP, a control board is displayed, or a control board displayable state is maintained, if there is an incoming call to the mobile terminal 100 or a user answers an incoming call, the controller 180 can transmit a control signal, which is generated to automatically lower (or mute) a volume of such an audio output device as a TV, an audio system and the like, to an external device. If determining that the phone call is ended, the controller 180 may control the volume of the audio output device such as the TV, the audio system and the like to automatically return to the previous volume. While a phone call is made, the controller 180 may control a voice in the phone call to be outputted through the TV, the audio system or the like.

While the mobile terminal 100 is connected to a previously registered AP or a control board displayable state is maintained, if there is an incoming video call to the mobile terminal 100, the controller 180 may control the video call to be displayed through such a video output device as a TV and the like.

If the wireless internet module 113 cancels the access to the previously registered AP [S605], the controller 180 stops displaying the control board and may control the remote controller program to be automatically ended [S606].

In the example shown in FIG. 6, the activation or termination of the remote controller program is automatically adjusted depending on the access to the previously registered AP or the cancellation of the access. Yet, it may not be mandatory for the activation or termination of the remote controller program to be automatically performed. The controller 180 may control the activation or termination of the remote controller program based on a user's input. In doing so, an activate/end button of the remote controller program may be provided as a quick icon that is paged from the status bar.

For instance, referring to FIG. 8 (*b*), based on a touch input to a quick icon button 840 named 'remote controller', the controller 180 can control activation and termination of the remote controller program. Even if the mobile terminal 100 is not connected to the previously registered AP, the controller 180 may control the remote controller program to be activated through a touch input to the quick icon button 840. On the contrary, even if the mobile terminal 100 is currently connected to the previously registered AP, the controller 180 may control the remote controller program to be terminated through a touch input to the quick icon button 840.

In the above-described example, the mobile terminal 100 according to the present invention is able to transmit a control signal to an external device using at least one of the wireless internet module 13 and the short range communication module 114. In case of transmitting a control signal using the short range communication module 114 by IrDA communication, there is such a limitation that the short range communication module 114 should face the external device. Yet, in case of transmitting a control signal using the wireless internet module 113, there is no such limitation.

In case that the mobile terminal 100 is able to transmit a control signal using both of the wireless internet module 113 and the short range communication module 114, the controller 180 may control the control signal to be transmitted by selecting one of the communication modules depending on directionality of the mobile terminal 100. In particular, in case of detecting that the mobile terminal 100 has inclined over a prescribed angle through the sensing unit 140, the controller 180 can transmit the control signal via the wireless internet module 113. Otherwise, the controller 180 can transmit the control signal via the short range communication module 114.

For another instance, in case that a control signal is generated while an output mode of the touchscreen 151 is set to a landscape mode, the controller 180 can control the control signal to be transmitted using the wireless internet module 113. For another instance, in case that a control signal is generated while an output mode of the touchscreen 151 is set to a portrait mode, the controller 180 can control the control signal to be transmitted using the short range communication module 114.

In particular, as the mobile terminal 100 inclines over the prescribed angle, if the output mode of the touchscreen 151 is set to the landscape mode, the controller 180 determines that the short range communication module 114 of the mobile terminal 100 does not face the external device. Hence, the controller 180 transmits the control signal of no directionality using the wireless internet module 113.

On the contrary, while the output mode of the touchscreen 151 is set to the landscape mode, the short range communication module 114 may be set available. Moreover, while the output mode of the touchscreen 151 is set to the portrait mode, the wireless internet module 113 may be set available.

In case that the mobile terminal 100 is able to transmit a control signal via the short range communication module 1143 only (e.g., a network address of an external device is unknown or the mobile terminal 100 or the external terminal is not in a wireless internet accessed state), if the output mode of the touchscreen 151 is switched to the landscape mode from the portrait mode, the controller 180 can control the remote controller program to be automatically ended. In particular, if the mobile terminal 100 is determined as not facing the external device, the controller 180 determines that the external device is intended not to be remotely controlled any more, the remote controller program can be automatically ended.

According to one embodiment of the present invention, the above-described method (flowchart) can be implemented in a program recorded medium as processor-readable codes. The processor-readable media include all kinds of recording devices in which data readable by a processor are stored. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention provides the following advantages and/or features.

First of all, the present invention provides a mobile terminal, by which user's convenience in manipulating the mobile terminal is enhanced.

Secondly, if a mobile terminal according to the present invention enters a preset network, the mobile terminal can automatically function as a remote controller for controlling operations of an external terminal, thereby enhancing user's convenience.

Thirdly, the present invention facilitates an operation of an external terminal to be controlled while a screen of the mobile terminal is locked or another job is being performed via the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a wireless communication unit configured to perform Wi-Fi communication;
   an infrared data association (IrDA) communication unit configured to perform IrDA communication;
   a memory;
   a touch screen; and
   a controller operably coupled with the wireless communication unit, the IrDA communication unit, the memory, and the touch screen, the controller configured to:
      communicate with an access point (AP) via the wireless communication unit;
      cause the touch screen to display a first setting screen listing a plurality of external devices remotely controllable via the mobile terminal;
      select at least one of the plurality of external devices in response to a first input received via the first setting screen;
      cause the touch screen to display a second setting screen listing a plurality of APs;
      select the AP from the plurality of APs in response to a second input received via the second setting screen;
      cause the memory to store information related to the selected AP;
      cause the touch screen to display a feedback setting screen comprising a vibration feedback;
      select the vibration feedback in response to a third input received via the feedback setting screen;
      cause the touch screen to display a user interface in response to establishing a wireless connection between the wireless communication unit and the selected AP, wherein the user interface is for controlling the selected at least one of the plurality of external devices, and the establishing of the wireless connection is based on the stored information; and
      control the selected at least one of the plurality external devices by causing the IrDA communication unit to transmit a signal to the selected at least one of the plurality of external devices in response to a fourth input received via the user interface, the vibration feedback output at the mobile terminal when the fourth input is received via the user interface.

2. The mobile terminal of claim 1, wherein the controller is further configured to:
   cause the touch screen to display at least one activation tab in the user interface, the at least one activation tab corresponding to the selected at least one of the plurality of external devices.

3. The mobile terminal of claim 2, wherein the user interface does not include tabs corresponding to external devices among the plurality of external devices other than the selected at least one of the plurality of external devices.

4. The mobile terminal of claim 2, wherein the controller is further configured to:
   select a manufacturer matching the selected at least one of the plurality of external devices from a list of manufactures in response to a fifth input.

5. The mobile terminal of claim 4, wherein the controller is further configured to:
   generate the signal by using an IR code corresponding the selected manufacturer.

6. The mobile terminal of claim 2, wherein the controller is further configured to cause light-emitting diode (LED) flickering at the mobile terminal when the fourth input is received via the user interface.

7. The mobile terminal of claim 1, wherein the controller is further configured to cause a feedback output comprising at least two feedback types when the fourth input is received via the user interface, the at least two feedback types comprising the vibration feedback.

8. The mobile terminal of claim 1, wherein the controller is further configured to cause the touch screen to display the user interface as a widget.

9. The mobile terminal of claim 1, wherein the controller is further configured to cause the touch screen to display the user interface on a home screen.

10. The mobile terminal of claim 1, wherein the controller is further configured to cause the touch screen to display the user interface on a status board.

11. The mobile terminal of claim 10, wherein the status board comprises a setting menu related with the mobile terminal.

12. The mobile terminal of claim 1, wherein the controller is further configured to cause the touch screen to display the user interface on a locked screen.

13. The mobile terminal of claim 1, wherein:
causing the memory to store the information comprises registering the AP that belongs to a preset network; and
the mobile terminal enters the preset network to establish the wireless connection between the wireless communication unit and the registered AP when the mobile terminal moves to an area where the AP is located.

14. The mobile terminal of claim 1, wherein the controller is further configured to cause the displaying of the user interface automatically without requiring a user input when the wireless connection is established between the wireless communication unit and the registered AP.

15. The mobile terminal of claim 14, wherein the information related to the selected AP comprises at least one of:
a service set identifier (SSID) of the AP; or
a network address of the AP.

16. The mobile terminal of claim 1, wherein the plurality of external devices comprise at least one of a TV, a settop box, an audio device, or an air conditioner.

17. The mobile terminal of claim 16, wherein a configuration of the user interface is changed according to a type of the selected at least one of the plurality of external devices.

18. The mobile terminal of claim 1, wherein the selected AP and the selected at least one of the plurality of external devices are different devices.

19. The mobile terminal of claim 1, wherein the controller is further configured to cause the touch screen to display the user interface for controlling the selected at least one of the plurality external devices in response to a fifth input received via an input unit of the mobile terminal.

20. The mobile terminal of claim 19, wherein the fifth input is received while no wireless connection is established between the wireless communication unit and the selected AP.

21. A mobile terminal comprising:
a wireless communication unit configured to perform Wi-Fi communication;
an infrared data association (IrDA) communication unit configured to perform IrDA communication;
a memory;
a touch screen; and
a controller operably coupled with the wireless communication unit, the IrDA communication unit, the memory, and the touch screen, the controller configured to:
select at least one external device from a plurality of external devices that are remotely controllable via the mobile terminal;
select an access point (AP) from a plurality of APs;
cause the memory to store information related to the selected AP;
communicate with the selected AP via the wireless communication unit;
cause the touch screen to display a user interface in response to establishing a wireless connection between the wireless communication unit and the selected AP, wherein the user interface is for controlling the selected at least one external device, and the establishing of the wireless connection is based on the stored information; and
control the selected at least one external device by causing the IrDA communication unit to transmit a signal to the selected at least one external device in response to an input received via the user interface, the mobile terminal vibrated when the input is received via the user interface.

22. The mobile terminal of claim 21, wherein the wireless connection establishment between the wireless communication unit and the selected AP causes the displaying of the user interface on the touch screen such that the user interface is displayed without requiring a user input when the wireless connection is established between the wireless communication unit and the selected AP.

23. The mobile terminal of claim 21, wherein the controller is further configured to cause the touch screen to display the user interface as a widget.

24. A method for controlling a mobile terminal, the method comprising:
communicating with an access point (AP) via a wireless communication unit configured to perform Wi-Fi communication;
displaying, on a touch screen, a first setting screen listing a plurality of external devices remotely controllable via the mobile terminal;
selecting at least one of the plurality of external devices in response to a first input received via the first setting screen;
displaying, on the touch screen, a second setting screen listing a plurality of APs;
selecting the AP from the plurality of APs in response to a second input received via the second setting screen;
storing information related to the selected AP in a memory;
displaying, on the touch screen, a feedback setting screen comprising a vibration feedback;
selecting the vibration feedback in response to a third input received via the feedback setting screen;
displaying, on the touch screen, a user interface in response to establishing a wireless connection between the wireless communication unit and the selected AP, wherein the user interface is for controlling the selected at least one of the plurality of external devices, and the establishing of the wireless connection is based on the stored information; and
controlling the selected at least one of the plurality external devices by causing an infrared data association (IrDA) communication unit to transmit a signal to the selected at least one of the plurality external devices in response to a fourth input received via the user interface, the vibration feedback output at the mobile terminal when the fourth input is received via the user interface.

25. The method of claim 24, further comprising:
displaying, via the touch screen, at least one activation tab in the user interface, the at least one activation tab corresponding to the selected at least one of the plurality of external devices,
wherein the user interface does not include tabs corresponding to external devices among the plurality of external devices other than the selected at least one of the plurality of external devices.

26. The method of claim 25, further comprising:
selecting a manufacturer matching the selected at least one of the plurality of external devices from a list of manufactures in response to a fifth input such that the IrDA communication unit can transmit the signal to the selected at least one of the plurality of external devices.

27. The method of claim 25, further comprising:
cause light-emitting diode (LED) flickering at the mobile terminal when the fourth input is received via the user interface.

28. The method of claim 24, further comprising:
causing a feedback output comprising at least two feedback types when the fourth input is received via the user interface, the at least two feedback types comprising the vibration feedback.

29. The method of claim 24, wherein the user interface is displayed as a widget.

30. The method of claim 24, wherein the user interface is displayed on a home screen.

31. The method of claim 24, wherein the user interface is displayed on a status board.

32. The method of claim 24, wherein the user interface is displayed on a locked screen.

33. The method of claim 24, wherein:
storing the information comprises registering the AP that belongs to a preset network; and
the mobile terminal enters the preset network to establish the wireless connection between the wireless communication unit and the registered AP when the mobile terminal moves to an area where the AP is located.

34. The method of claim 33, wherein the user interface is displayed automatically without requiring a user input when the wireless connection is established between the wireless communication unit and the registered AP.

35. The method of claim 34, wherein the information related to the selected AP comprises at least one of:
a service set identifier (SSID) of the AP; or
a network address of the AP.

* * * * *